US011396926B2

(12) United States Patent
Gorinstein (10) Patent No.: US 11,396,926 B2
(45) Date of Patent: Jul. 26, 2022

(54) TOROIDAL GEARBOX FOR SLEWING MECHANISMS

(71) Applicant: LocuDrive Ltd., Ramat Hasharon (IL)

(72) Inventor: Alexander Gorinstein, Netanya (IL)

(73) Assignee: LocuDrive Ltd., Ramat Hasharon (IL)

( * ) Notice: Subject to any disclaimer, the term of this patent is extended or adjusted under 35 U.S.C. 154(b) by 0 days.

(21) Appl. No.: 17/483,857

(22) Filed: Sep. 24, 2021

(65) Prior Publication Data

US 2022/0099160 A1 Mar. 31, 2022

Related U.S. Application Data (60) Provisional application No. 63/083,217, filed on Sep. 25, 2020.

(51) Int. Cl.
| | |
|---|---|
| *F16H 1/16* | (2006.01) |
| *F16H 1/20* | (2006.01) |
| *F16H 1/22* | (2006.01) |
| *F16H 55/22* | (2006.01) |
| *F16H 57/039* | (2012.01) |

(52) U.S. Cl.
CPC ............ *F16H 1/225* (2013.01); *F16H 55/22* (2013.01); *F16H 57/039* (2013.01); *F16H 2702/00* (2013.01)

(58) Field of Classification Search
CPC ........ F16H 1/225; F16H 55/22; F16H 57/039; F16H 2702/00
See application file for complete search history.

(56) References Cited

U.S. PATENT DOCUMENTS

| | | | | |
|---|---|---|---|---|
| 856,405 | A * | 6/1907 | Janson | F16H 1/125 |
| | | | | 74/424.5 |
| 3,242,755 | A * | 3/1966 | Kuehnle | F16H 1/30 |
| | | | | 74/424.5 |
| 4,297,919 | A * | 11/1981 | Kuehnle | F16H 1/30 |
| | | | | 475/331 |
| 5,784,923 | A * | 7/1998 | Kuehnle | F16H 1/30 |
| | | | | 475/345 |
| 5,886,450 | A * | 3/1999 | Kuehnle | H02K 99/00 |
| | | | | 310/261.1 |
| 6,584,867 | B2 | 7/2003 | Kennedy | |
| 6,622,677 | B2 | 9/2003 | Simpson | |
| 6,776,064 | B2 | 8/2004 | Bucholz | |
| 7,806,016 | B2 | 10/2010 | Shimizu | |

(Continued)

FOREIGN PATENT DOCUMENTS

| | | | | |
|---|---|---|---|---|
| DE | 102016118877 | B4 * | 10/2019 | ........... F16H 37/041 |
| GB | 2517466 | A | 2/2015 | |

OTHER PUBLICATIONS

International Search Report and Written Opinion issued in corresponding international application PCT/IL2021/051165 dated Dec. 27, 2021.

*Primary Examiner* — Jake Cook
(74) *Attorney, Agent, or Firm* — Heidi Brun Associates Ltd.

(57) ABSTRACT

A high transmission ratio gearbox of ring shape for easy integration inside mechanisms with limited space and robotic rotating joints for moving robotic arms. The toroidal gearbox includes at least one dual function gear, a toroidal spiral face drive to mesh with the at least one dual function gear and a cylindrical gear to mesh with the at least one dual function gear.

14 Claims, 11 Drawing Sheets

(56) References Cited

U.S. PATENT DOCUMENTS

| | | | |
|---|---|---|---|
| 8,051,737 B2 | 11/2011 | Li | |
| 8,302,502 B2 | 11/2012 | Carrier | |
| 8,460,064 B2 | 6/2013 | Yanase | |
| 8,587,170 B2 | 11/2013 | Caliendo | |
| 10,634,217 B2 | 4/2020 | Figura | |
| 2004/0079183 A1* | 4/2004 | Willmot | F16H 3/06 74/393 |
| 2004/0147362 A1* | 7/2004 | Kuehnle | F16H 57/04 476/42 |
| 2004/0237689 A1* | 12/2004 | Hiltbrand | F16H 1/125 74/457 |
| 2006/0005653 A1* | 1/2006 | Fleytman | F16H 1/06 74/425 |
| 2009/0031974 A1* | 2/2009 | Lichti | F01L 1/34 123/90.17 |
| 2013/0042711 A1 | 2/2013 | Napau et al. | |

* cited by examiner

TOROIDAL GEARBOX FOR SLEWING MECHANISMS

CROSS REFERENCE TO RELATED APPLICATIONS

This application claims priority from U.S. Provisional Patent Application 63/083,217, filed Sep. 25, 2020, which is incorporated herein by reference.

FIELD OF THE INVENTION

The present invention relates to slewing drives generally and to gearing of slewing drives in particular.

BACKGROUND OF THE INVENTION

A slew drive, or a slewing drive, is an assembly that holds radial and axial loads and can apply rotating torque to generate and control the motion of objects or payloads. Slewing drives are used to rotate and position systems mounted on a pedestal, such as defense turrets, video surveillance cameras, robots and other systems. In the fields of robotics, communications, machinery, medical devices and aerospace, systems require accurate positioning of equipment. Pedestal mounted systems are often heavy and require high torque to rotate them. High levels of torque are difficult to achieve using only a motor, and gearing is usually necessary to increase the output torque of motors. In compact actuators, it is difficult to generate high torque to mass ratios, and high torque to volume ratios.

Figure 1A:
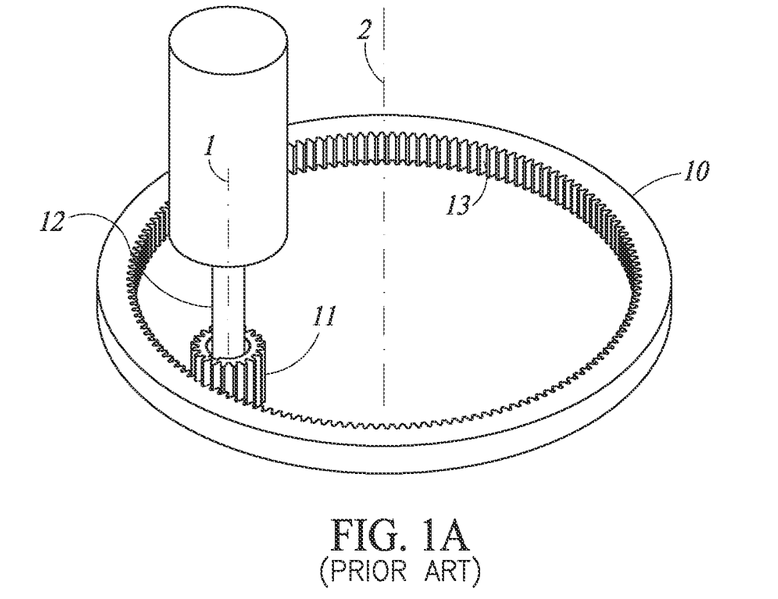
FIG. 1A is a schematic illustration of an internal cylindrical gear driven internally by a cylindrical drive.
Figure 1B:
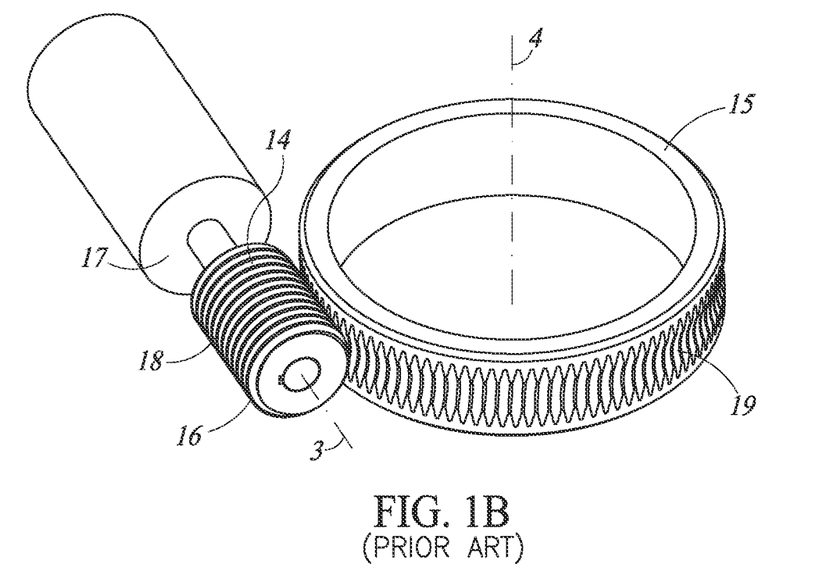
FIG. 1B is a schematic illustration of an external worm gear driven externally by a worm drive.

Slewing drives are a combination of gearing, bearings, seals, housing, a motor and other elements that indicate position. Reference is made to FIGS. 1A and 1B which illustrate two slewing drive implementations. FIG. 1A illustrates an internal cylindrical gear 10, driven internally by a cylindrical drive 11, also known as a pinion, that is mounted on a motor shaft 12. In this example, cylindrical drive 11 meshes with the teeth 13 on the inside of output cylindrical gear 10, on a parallel axis 1 to a central axis 2 of cylindrical gear 10.

Cylindrical drive 11 has fewer teeth on its circumference than cylindrical gear 10 has on its inner edge; hence it will take many revolutions of cylindrical drive 11 to complete a single revolution of output gear 10. This resulting reduction in speed between cylindrical drive 11 and cylindrical gear 10 results in a proportional increase in torque from cylindrical drive 11 to output gear 10.

It should be noted that cylindrical gear 10 could also be external and driven externally, and that the cylindrical gear could be, for example, a spur gear or a helical gear. Additionally, an external cylindrical drive may be hourglass shaped, as is known in the art.

FIG. 1B illustrates an external worm gear 15, driven externally by a worm drive 16, also known as a worm pinion, that is mounted on a motor shaft 17. In this example, worm drive 16 has a cylindrically bound screw drive 18 that interfaces with teeth 19 and gashes 14 therebetween on the outside of output worm gear 15. Worm drive 16 rotates on an axis 3 perpendicular to a central axis 4 of output gear 15, and, as worm drive 16 rotates, it drives output gear 15. Worm drive 16 can have one or many 'starts,' which are individual tracks in the screw. For example, if there are three starts on screw drive 18, it will advance output gear 15 by three teeth 19, each time worm drive 16 completes a revolution.

Worm drive 16 usually takes many revolutions in order to advance output gear 15 by one complete revolution. This reduction in speed increases the torque of output gear 15. The increase in torque is proportional to the reduction in speed.

It should be noted that the cylindrical gear could also be internal and driven by a 'short' worm drive, internally.

SUMMARY OF THE PRESENT INVENTION

There is therefore provided, in accordance with a preferred embodiment of the present invention, a gearbox of ring shape. The gearbox includes a cylindrical gear and a toroidal spiral face drive. Both the cylindrical gear and the toroidal spiral face drive have a toroidal shape surrounding a circular opening centered around a gearbox axis. The toroidal spiral face drive drives the cylindrical gear.

There is therefore provided, in accordance with a preferred embodiment of the present invention, a spiral drive including a cylindrical gear and a toroidal spiral face drive. The cylindrical gear has a first central axis, and the toroidal spiral face drive has a second central axis parallel to the first central axis. The toroidal spiral face drive drives the cylindrical gear.

Moreover, in accordance with a preferred embodiment of the present invention, the spiral drive includes at least one dual function gear interfacing with the cylindrical gear and the toroidal spiral face drive. The at least one dual function gear has an axis perpendicular to the first and second central axes.

Further, in accordance with a preferred embodiment of the present invention, the toroidal spiral face drive has at least one spiral start.

Still further, in accordance with a preferred embodiment of the present invention, the cylindrical gear is a spur gear or a helical gear.

Moreover, in accordance with a preferred embodiment of the present invention, the at least one dual function gear has a profile which is a barrel profile, a short worm profile, an hourglass profile or a cylindrically bound profile.

Further, in accordance with a preferred embodiment of the present invention, at least a portion of the teeth of the at least one dual function gear are cut with crowning.

There is also provided, in accordance with a preferred embodiment of the present invention, a dual function gear including a single gear cut to mesh simultaneously with a toroidal spiral face drive and a cylindrical gear.

Moreover, in accordance with a preferred embodiment of the present invention, single gear has teeth which have a combined worm and cylindrical gear teeth shape.

Further, in accordance with a preferred embodiment of the present invention, the single gear has an axis perpendicular to a central axis of the toroidal spiral face drive and perpendicular to a central axis of the cylindrical gear.

Still further, in accordance with a preferred embodiment of the present invention, the gear has a barrel profile, an hourglass profile, a short worm profile, or a cylindrically bound profile.

Moreover, in accordance with a preferred embodiment of the present invention, the single gear has at least one start to its teeth.

Further, in accordance with a preferred embodiment of the present invention, at least a portion of the teeth are cut with crowning.

There is also provided, in accordance with a preferred embodiment of the present invention, a toroidal gearbox including at least one dual function gear, a toroidal spiral face drive to mesh with the at least one dual function gear, and a cylindrical gear to mesh the at least one dual function gear.

Moreover, in accordance with a preferred embodiment of the present invention, the at least one dual function gear has teeth which have a combined worm and cylindrical gear teeth shape.

Further, in accordance with a preferred embodiment of the present invention, the at least one dual function gear has an axis perpendicular to a central axis of the toroidal spiral face drive and perpendicular to a central axis of the cylindrical gear.

Still further, in accordance with a preferred embodiment of the present invention, the toroidal spiral face drive has at least one spiral start.

Moreover, in accordance with a preferred embodiment of the present invention, the cylindrical gear is a spur gear or a helical gear.

Further, in accordance with a preferred embodiment of the present invention, the gear has a barrel profile, an hourglass profile, a short worm profile, or a cylindrically bound profile.

Still further, in accordance with a preferred embodiment of the present invention, the at least one dual function gear has at least one start to its teeth.

Moreover, in accordance with a preferred embodiment of the present invention, at least a portion of the teeth are cut with crowning.

Further, in accordance with a preferred embodiment of the present invention, the gearbox includes a toroidal motor to drive the toroidal spiral face drive.

Still further, in accordance with a preferred embodiment of the present invention, the toroidal spiral face drive and the cylindrical gear have a toroidal shape surrounding a circular opening centered around a gearbox axis.

Moreover, in accordance with a preferred embodiment of the present invention, the at least one dual function gear is a plurality of the dual function gears arranged in a planetary arrangement.

Further, in accordance with a preferred embodiment of the present invention, the gearbox includes an internal ring upon which are mounted a spiral face drive bearing supporting the toroidal spiral face drive, a cylindrical gear bearing supporting the cylindrical gear, a rotating shaft supporting the at least one dual function gear, and dual function gear bearings supporting the rotating shaft.

Still further, in accordance with a preferred embodiment of the present invention, the bearings are rolling bearings fabricated from steel, plastic, ceramic, or bronze.

Moreover, in accordance with a preferred embodiment of the present invention, the bearings are rolling bearings, sliding bearings, or magnetic bearings.

Further, in accordance with a preferred embodiment of the present invention, the bearings are capable of carrying axial, radial and moment loads.

Finally, in accordance with a preferred embodiment of the present invention, the gearbox transmits rotational reverse motion from the cylindrical gear to the toroidal spiral face drive.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that slewing systems are assemblies that are customized for each application. The design of these customized solutions requires a high level of engineering expertise and design time to achieve requisite high positioning accuracy.

Applicant has also realized that slewing assemblies may require electricity, fluids, optical signals, electromagnetic waves, cables and other physical objects to pass through the slewing assembly to the mounted equipment. This requires a central passage, usually in a cylindrical form, in order to allow the integration of slip rings for current transmission and rotary joints for waveguide and fluid transmission.

Applicant realized that a slewing assembly solution in a toroidal format may be achieved using worm gearing and worm meshing, and by converting perpendicular meshing to parallel meshing, within a concentric axis gearbox.

Figure 2A:
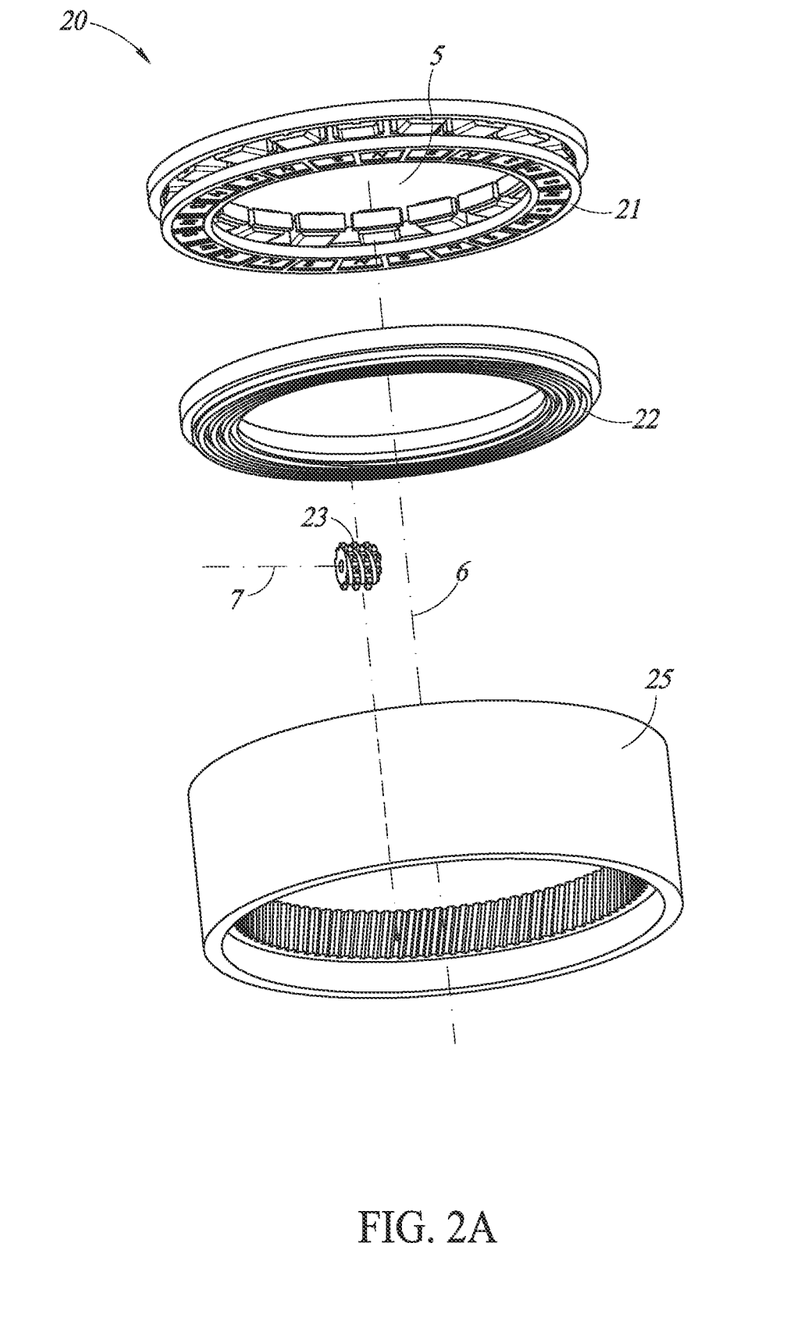
FIGS. 2A and 2B are an expanded and a schematic illustration of a toroidal gearbox, constructed and operative in accordance with a preferred embodiment of the present invention.
Figure 2B:
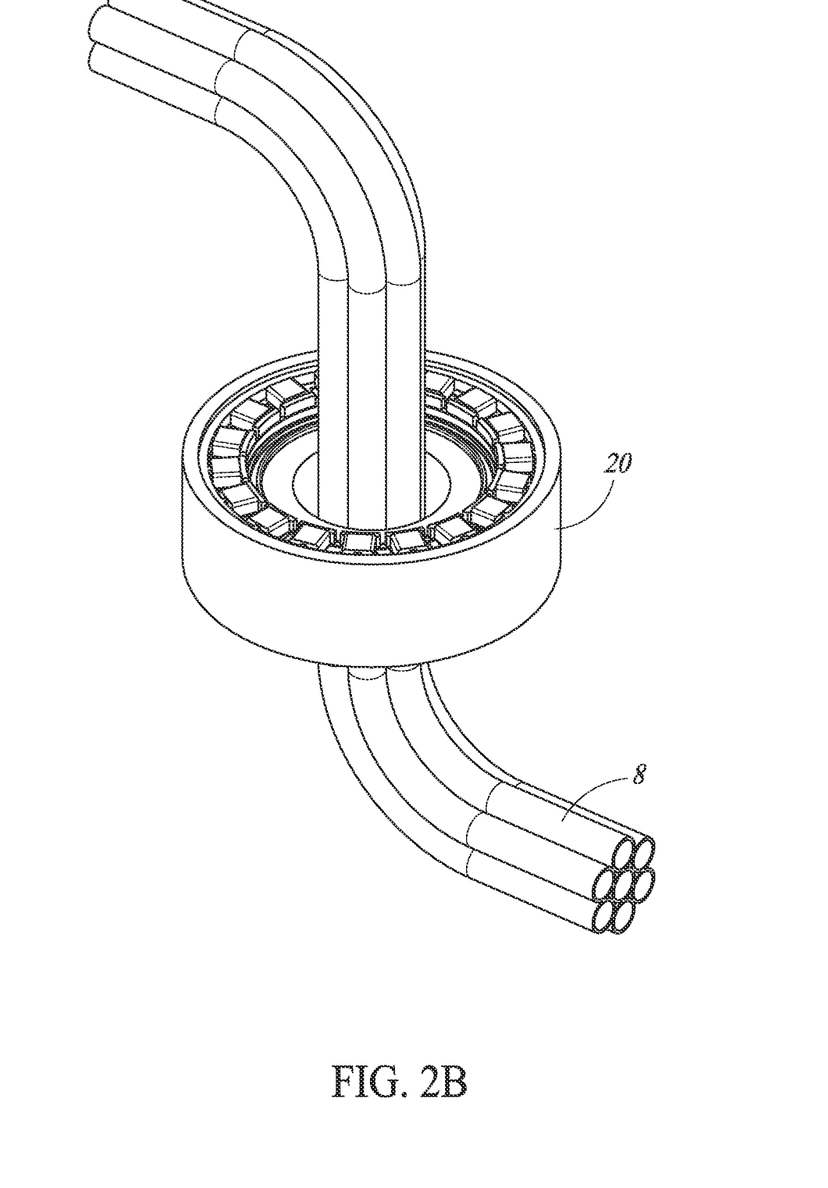

Reference is made to FIGS. 2A and 2B, which illustrate a toroidal gearbox 20, constructed and operative in accordance with a preferred embodiment of the present invention. Gearbox 20 comprises a toroidal motor 21, a spiral face drive 22, a dual function gear 23, and an output gear 25, where toroidal motor 21, spiral face drive 22 and output gear 25 may all have a toroidal shape surrounding a circular opening 5 centered around a gearbox axis 6. Dual function gear 23, which may have an axis 7 which may be perpendicular to gearbox axis 6, may be small enough not to operate within circular opening 5.

In accordance with a preferred embodiment of the present invention and as seen in FIG. 2B, it is through circular opening 5 that physical objects, such as cables 8, may pass.

Toroidal motor 21 may drive spiral face drive 22 around its central axis, which may typically be parallel to gearbox axis 6. In accordance with a preferred embodiment of the present invention, spiral face drive 22 may interface with, and in turn, may drive dual function gear 23 to turn around its perpendicular axis 7. Since dual function gear 23 may be geared to interface simultaneously with both spiral face drive 22 and output gear 25, the turning of dual function gear 23 around its perpendicular axis 7 may drive output gear 25 around its central axis, which may be gearbox axis 6 or may be an axis parallel to it.

Figure 3A:
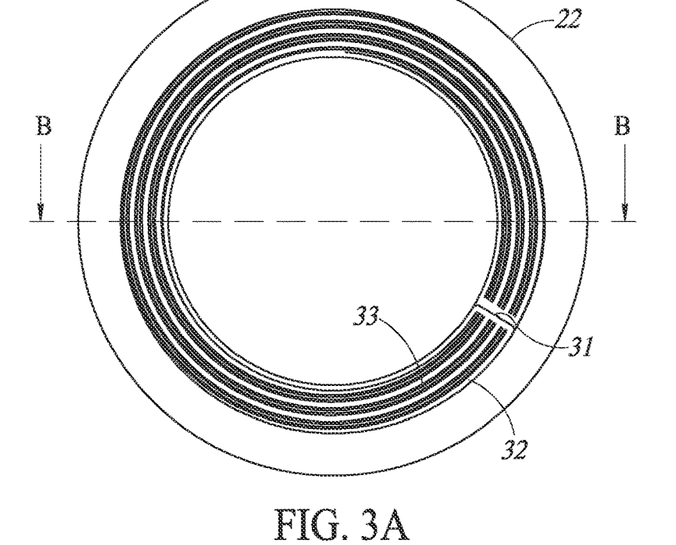
FIGS. 3A, 3B and 3C are bottom, sectional and isometric views, respectively, of a spiral face drive, useful in the gearbox of FIG. 2A.
Figure 3B:
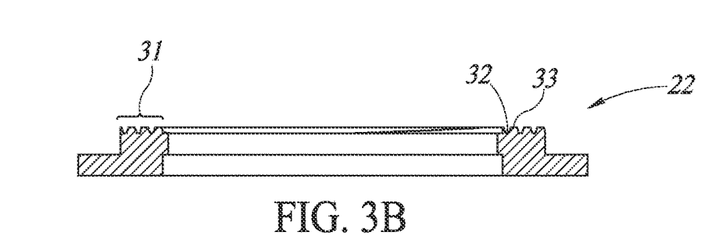
Figure 3C:
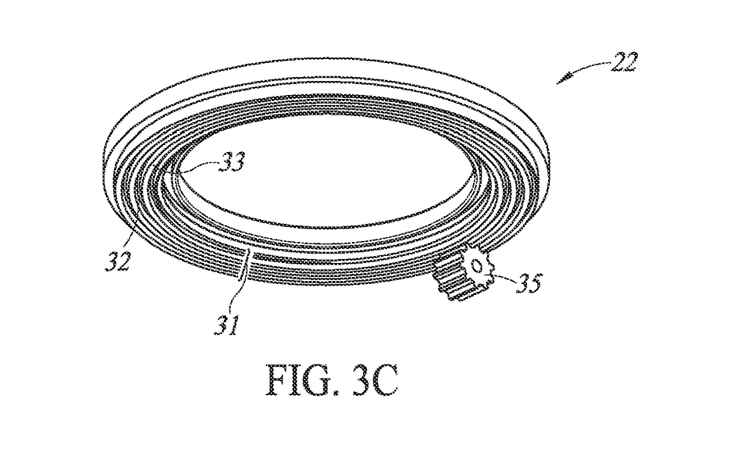

Applicant has realized that the rack profile of a spiral face drive is analogous to a cylindrical gear rack profile, and hence may mesh with and drive another cylindrical gear. Reference is made to FIGS. 3A, 3B and 3C, which are bottom, sectional (along line B-B in FIG. 3A), and isometric views, respectively, of spiral face drive 22. FIG. 3A illustrates the bottom view of spiral face drive 22 and shows a rack profile 31 along a spiral curve. Rack profile 31, which has a trough 32 (FIG. 3B) between peaks 33 of spiral rack profile 31, is similar to rack profiles described by the teeth and gashes of a cylindrical gear. FIG. 3C shows, in an isometric view, how a cylindrical gear 35 meshes with spiral track 32.

It should be noted that rack profile 31 may be analogous to a cylindrical gear rack profile with straight lines; however, it may also have other profiles which may mesh with other cylindrical gear teeth profiles, such as helical profiles. Furthermore, the profiles of the gear teeth may be any conjugating profile, such as, but not limited to, 'involute' and 'cycloid' profiles.

Figure 3D:
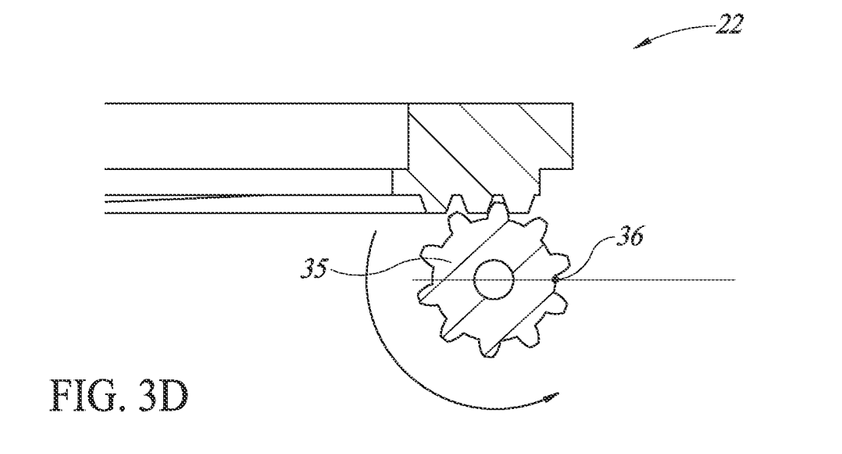
FIGS. 3D and 3E are schematic illustrations of a revolution of the spiral face drive when meshed with a cylindrical gear.
Figure 3E:
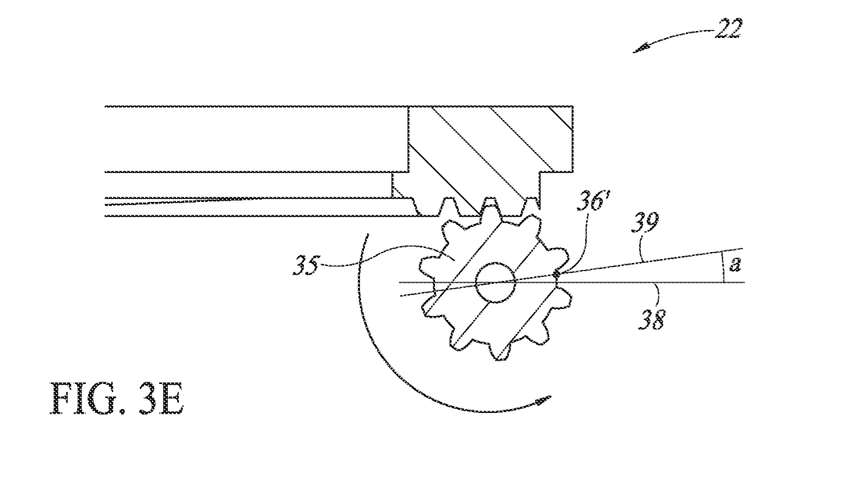

Reference is made to FIGS. 3D and 3E which together illustrate what happens after a single revolution of spiral face drive 22 when meshed with cylindrical gear 35. FIGS. 3D and 3E have a point marked on their cylindrical gear 35, where the point is indicated as 36 in FIG. 3D and as 36' in FIG. 3E. At the beginning of the rotation, shown in FIG. 3D, point 36 is along a horizontal line 38 while, at the end of the rotation, shown in FIG. 3E, a radial line 39 defining point 36' has moved from the horizontal such that point 36' is above horizontal line 38 by an angle a. In other words, as spiral face drive 22 advances by a single revolution, it may advance cylindrical gear 35 by a fixed amount, such as one tooth. A spiral track is analogous to a start on a worm drive, as mentioned hereinabove. If there are multiple spirals, cylindrical gear 35 may advance by an equivalent number of teeth.

Figures 4A, 4B:
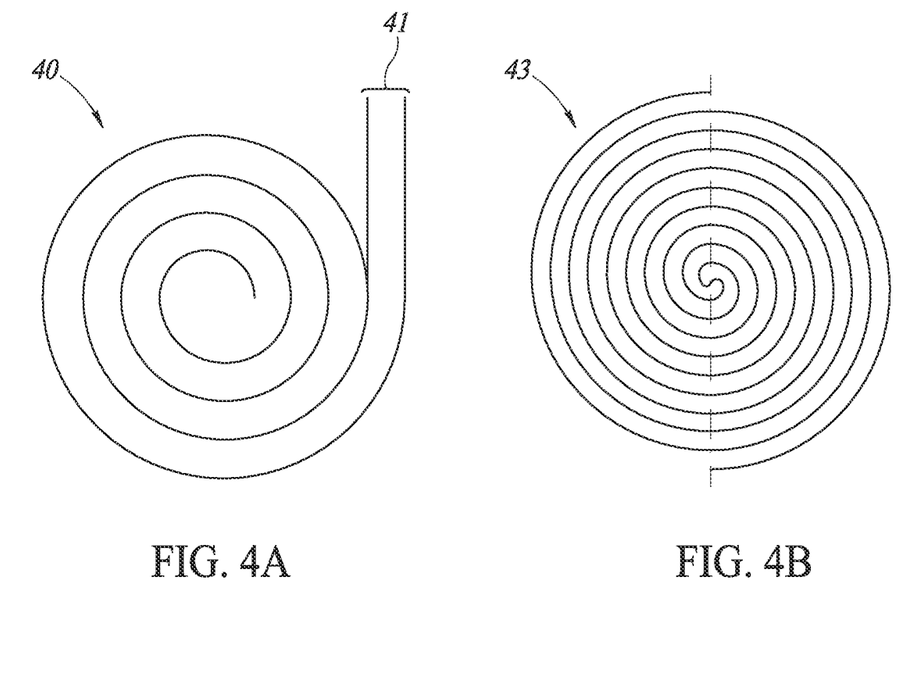
FIGS. 4A, 4B and 4C are schematic illustrations of spiral rack profiles.
Figure 4C:
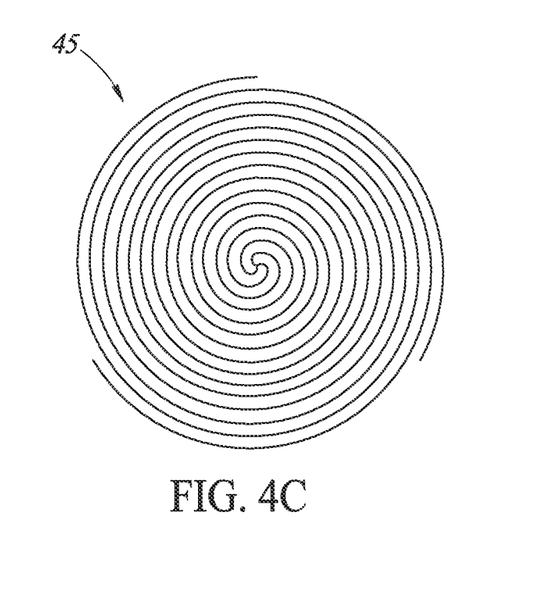

Reference is now made to FIGS. 4A, 4B and 4C which illustrate different spiral rack profiles. FIG. 4A illustrates a single spiral profile 40 which can be described by parametric equation 1:

$$r(t, \theta(t)) \quad (1)$$

where r is the radius as function of a parameter t, and $\theta(t)$ is the phase angle as function of t.

Equation 1 may be converted to a Cartesian coordinate system where each point on the spiral in FIG. 4A is described by coordinates (x, y) as shown in equations 2 and 3:

$$x = N \cdot \text{pitch} \cdot t \cdot \cos(2 \cdot \pi \cdot t + \varphi(u, N)) \quad (2)$$

$$y = N \cdot \text{pitch} \cdot t \cdot \sin(2 \cdot \pi \cdot t + \varphi(u, N)), a < t < b \quad (3)$$

where N is the number of spirals in the range of {1, 2, 3 . . . n}, pitch is the pitch of a gear, labeled 41 in FIG. 4A, and $\varphi(u, N)$ is the phase angle, which is equal to $$u \frac{360°}{N},$$

where u is the spiral number. The spiral may be "right handed" (i.e., counter clockwise) or "left handed" (i.e., clockwise). In the latter case, 90° is added to phase angle $\varphi(u, N)$.

The linear distance during a single rotation of spiral *face drive 22 is a function of the number of spiral starts and the pitch, as described by equation 4:

$$\text{distance} = N \cdot \text{pitch} \quad (4)$$

FIGS. 4B and 4C illustrate two exemplary rack profiles and respectively show a spiral rack profile 43 with two spirals, or two starts, and a spiral rack profile 45 with three spirals, or three starts. It will be appreciated that other rack profiles, with different numbers of spirals, are also possible.

As mentioned hereinabove, dual function gear 23 meshes with spiral face drive 22 and output gear 25 simultaneously. It will be appreciated that in order to mesh with spiral face drive 22, dual function gear 23 may require a cylindrical gear teeth shape, similar to that of a spur, helical or other cylindrical gear. However, in order to mesh with and drive output gear 25, dual function gear 23 may also require a worm or screw teeth shape. In accordance with a preferred embodiment of the present invention, dual function gear 23 has teeth which have a combined worm and cylindrical gear teeth shape.

Figure 5A:
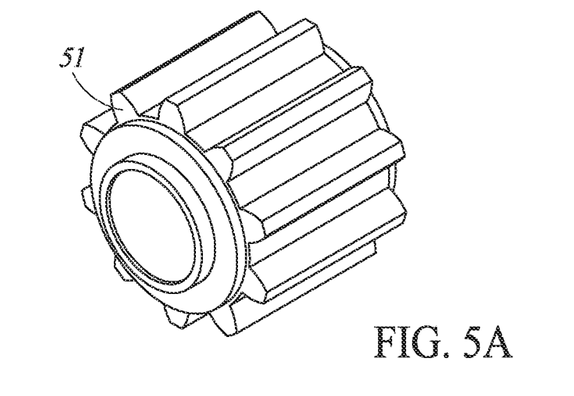
FIGS. 5A, 5B and 5C are isometric views of a spur gear, a worm gear and a dual function gear having combined spur and worm gear profiles, respectively.
Figure 5B:
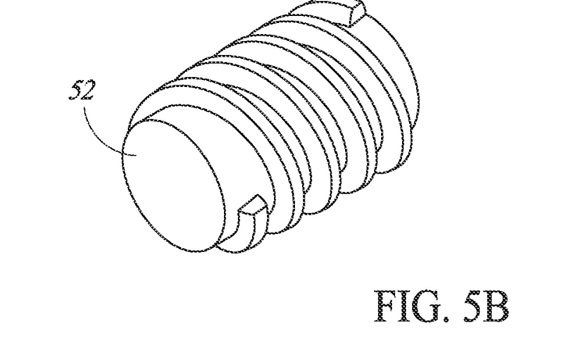

Reference is now made to FIGS. 5A and 5B which illustrate two gears from which dual function gear 23 may be designed. FIG. 5A shows an exemplary spur gear having cylindrical gear teeth 51 which can mesh with spiral face drive 22. FIG. 5B shows an exemplary worm gear having worm teeth 52, where each tooth is curved rather than straight, which may mesh with output gear 25.

Figure 5C:
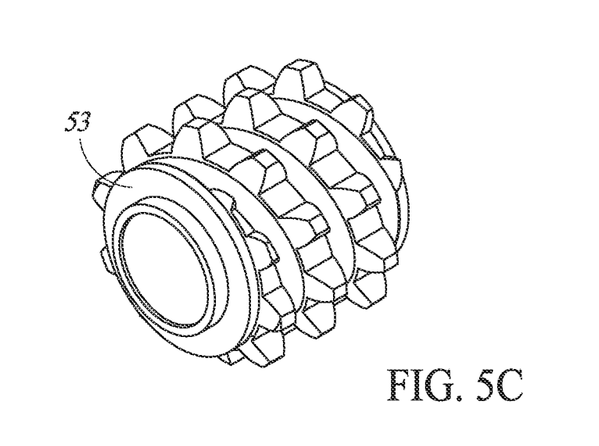

As mentioned hereinabove, dual function gear 23 has teeth whose shape is formed of a combination of worm teeth 52 and cylindrical gear teeth 51, as shown in FIG. 5C, to which reference is now briefly made. Cylindrical gear teeth 51 may be implemented along the helical curve of worm teeth 52, resulting in a combined tooth profile for dual function gear 23.

It will be appreciated that dual function gear 23, as a whole, may have a short worm profile, or it may have a barrel profile, similar to those used in internal gear applications, or it may have an hourglass profile as used in external gear applications. Alternatively, the teeth of dual function gear 23 may be inclined with respect to output gear 25 which may cause the central axis of output gear 25 to be inclined to gearbox axis 6. the teeth of dual function gear 23 may also be crowned or may have other longitudinal profile modifications similar to crowning.

Attention is once again drawn to FIG. 2A. Spiral face drive 22 may drive dual function gear 23 via the portion of its profile which is similar to cylindrical teeth 51, of which there may be $Z_{Cyl}$ teeth. As discussed above with respect to FIGS. 3D and 3E, a single revolution of spiral face drive 22 may advance dual function gear 23 by a number of teeth equal to the number N of spirals on spiral face drive 22. Dual function gear 23 may simultaneously mesh with output gear 25 via the portion of its profile which is similar to worm teeth 52, of which there may be $Z_{Wormgear}$ teeth. Moreover, dual function gear 23 may also have a number $N_{Worm}$ of starts of its teeth, similar to the starts of a worm gear. When dual function gear 23 may rotate a single turn) (360° around its axis of rotation 7, it may advance output gear 25 by $N_{Worm}$ teeth. Accordingly, a gearbox transmission ratio i of toroidal gearbox 20 may be characterized by equation 5:

$$i = \frac{N_{input}}{N_{Output}} = \frac{Z_{Cyl}}{N_{starts}} \cdot \frac{Z_{Wormgear}}{N_{Worm}} \quad (5)$$

where $N_{Input}$ is the number of input revolutions of spiral face drive 22, and $N_{Output}$ is the number of output revolutions of output gear 25.

Gearbox ratio i may range from a low ratio of 1:30 to a high ratio of 1:1000. A low ratio may be achieved, for example, using $Z_{Cyl}$=6, $N_{Starts}$=3, $Z_{Wormgear}$=45 and $N_{Worm}$=3. A high ratio may be achieved, for example, using $Z_{Cyl}$=10, $N_{Starts}$=1, $Z_{Wormgear}$=100 and $N_{Worm}$=1. It should be noted that the gearing ratio may be as low as 1:1.

Gearbox ratio i may reduce the motor speed by a factor of i, as described by equation 6:

$$S_{Output} = \frac{S_{input}}{i} \quad (6)$$

where $S_{Output}$ equals the gearbox output speed, and $S_{input}$ equals the gearbox input speed.

Correspondingly, gearbox ratio i increases the output torque as described in equation 7:

$$T_{output} = T_{input} \cdot i \quad (7)$$

where $T_{output}$ equals the gearbox output torque and $T_{input}$ equals the gearbox input torque. It should be noted that toroidal gearbox 20 may also have frictional losses, as known in the art, that have not been shown in this example.

The forces acting between dual function gear 23 and output gear 25 may cause stresses and deflection of teeth. These stresses and the strength of gearing may limit the load size that can be handled by toroidal gearbox 20.

Figures 6A, 6B:
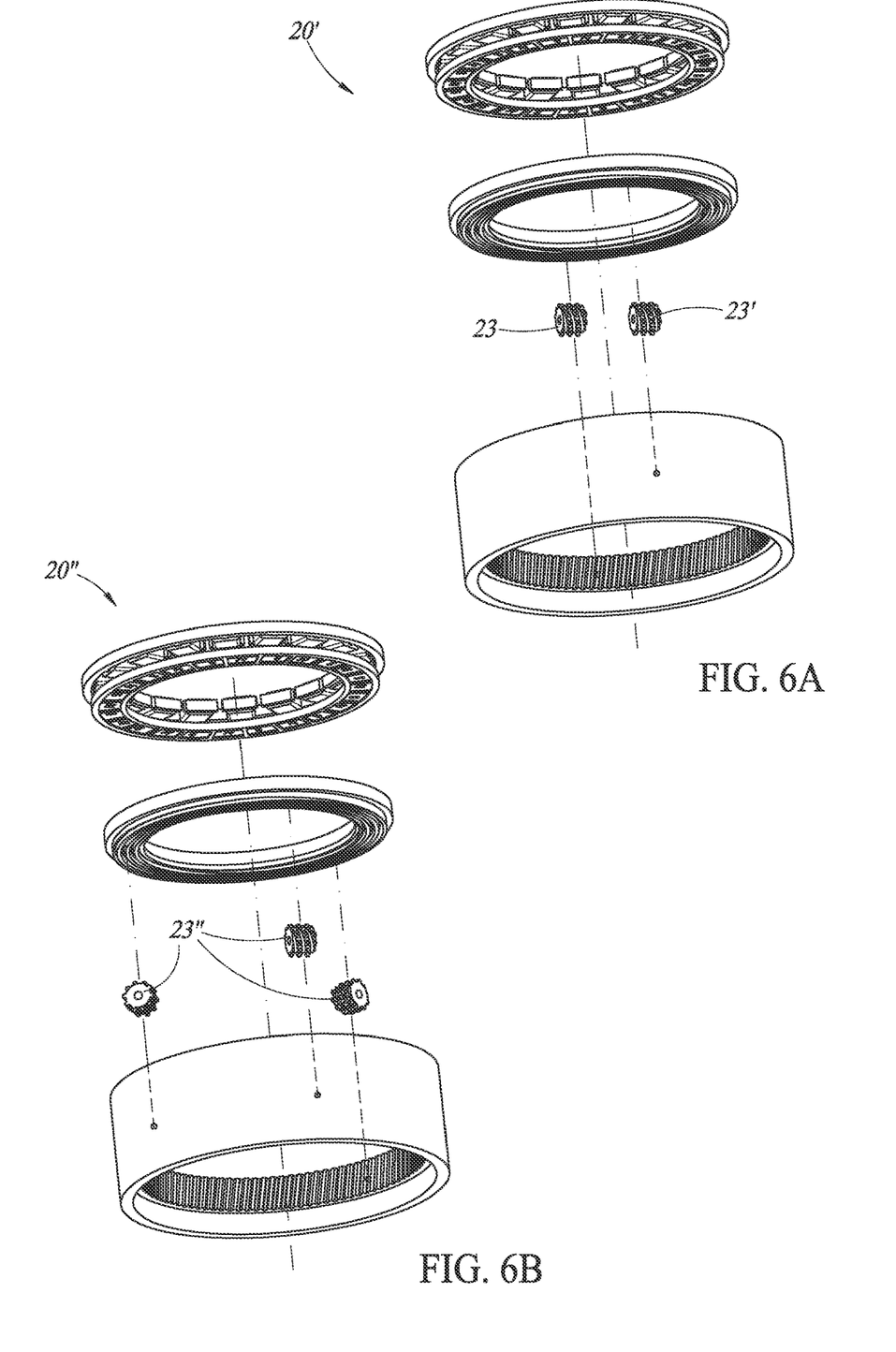
FIGS. 6A and 6B are schematic illustrations of a toroidal gearbox with multiple dual function gears, constructed and operative in accordance with a second preferred embodiment of the present invention.

In an alternate embodiment, a plurality of dual function gears 23 may be positioned in a planetary fashion, around gearbox axis 6, to distribute torque between them. In this embodiment, toroidal gearbox 20 may have a plurality $N_s$ of dual function gears 23 each meshing with output gear 25 and situated in planetary form (i.e., equidistant) around gearbox axis 6. Attention is briefly drawn to FIGS. 6A and 6B which respectively illustrate a toroidal gearbox 20' with two dual function gears 23' arranged 180 degrees apart, and a toroidal gearbox 20" with three dual function gears 23" arranged 120 degrees apart. Such an arrangement may divide transmitted torque across all dual function gears 23 as described by equation 8:

$$T = T_{allowed} \cdot N_s \quad (8)$$

where T is the total torque capacity, and $T_{allowed}$ is the allowed torque transmission capacity per dual function gear 23.

It should be noted that when a plurality of dual function gears 23 are used, the forces acting between each gear 23 may vary, due to imperfections of geometry caused by production technology. Since loads cannot be shared equally between each gear 23, transmission ability may be decreased by a factor c, called the load sharing efficiency, where 0<c<1 and for a perfect geometry c→1.

It will be appreciated that, when multiple dual function gears 23 are located as planetary gears, their locations with respect to each should be determined as a function of phase angle limitations, as known in the design of planetary gear trains. In addition, and in accordance with a preferred embodiment of the present invention, the location should also be determined from the number $N_{starts}$ of starts and number of teeth $Z_{Wormgear}$ and $Z_{Spiral}$ of the output gear and the spiral face gear, respectively. Accordingly, the total torque capacity of equation 8 may be better described by equation 9:

$$T = c \cdot T_{allowed} \cdot N_s \quad (9)$$

Figure 7A:
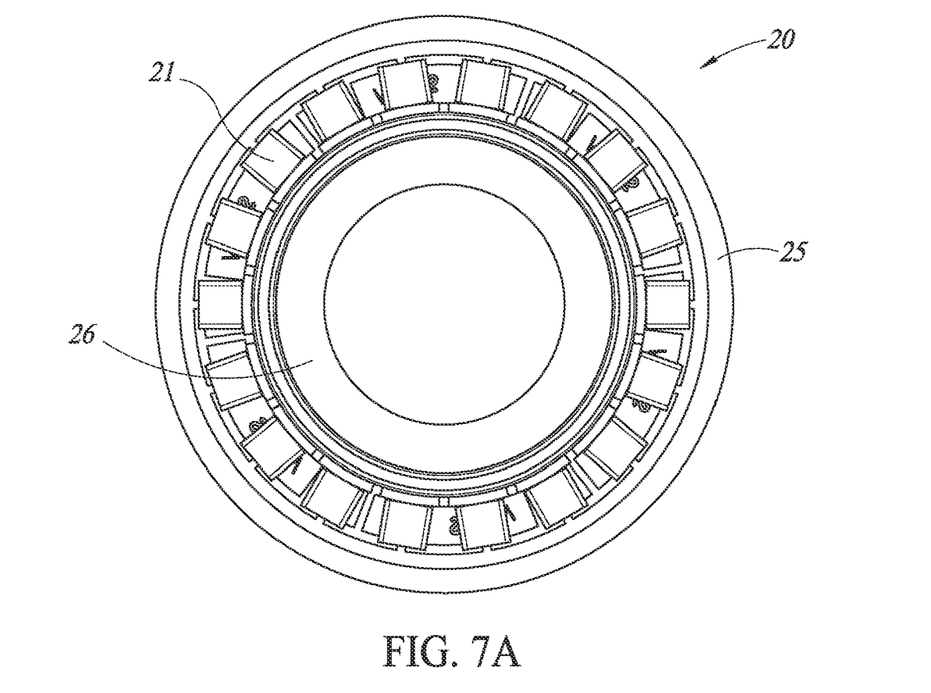
FIGS. 7A, 7B and 7C are top, sectional and exploded views of a complete toroidal gearbox, constructed and operative in accordance with a third preferred embodiment of the present invention.
Figure 7B:
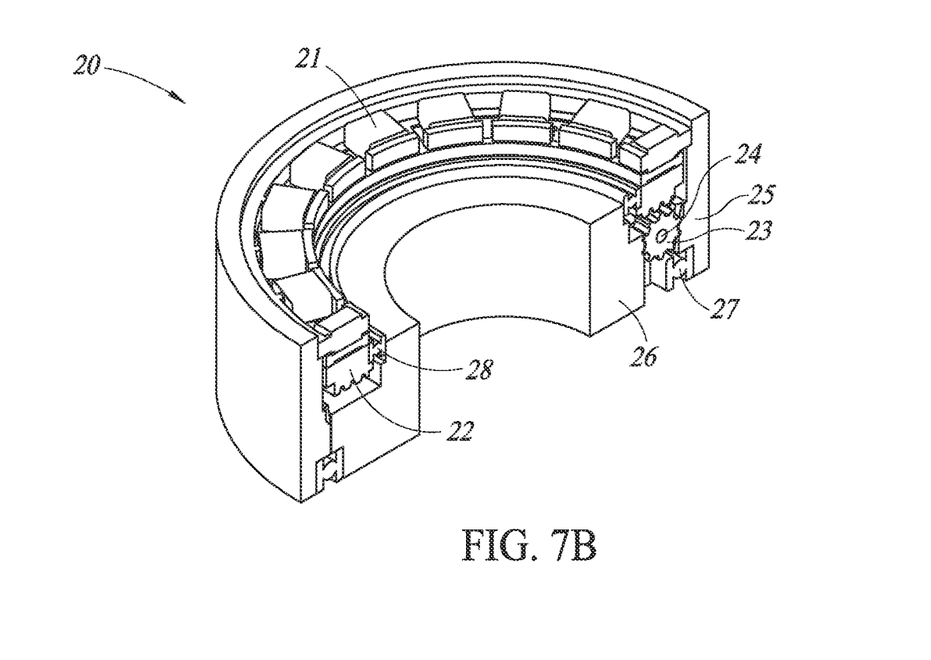
Figure 7C:
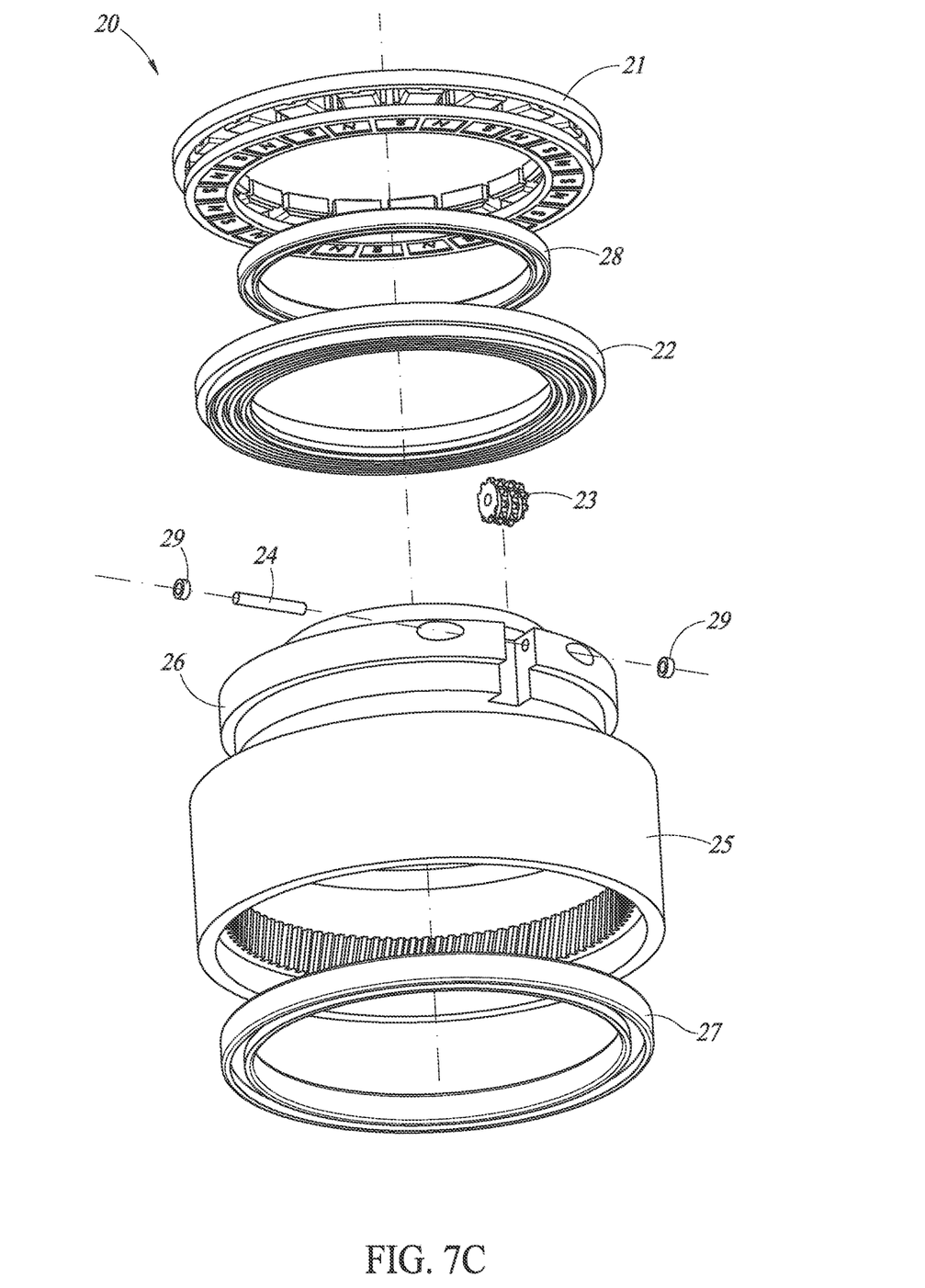

Reference is made to FIGS. 7A, 7B and 7C which illustrate multiple views of complete toroidal gearbox 20. FIG. 7A illustrates a top view of toroidal gearbox 20, showing motor 21, the outside of output gear 25, and the inside of an internal ring 26 or cage. FIG. 7B illustrates a sectional view of toroidal gearbox 20, showing a single instance of dual function gear 23, and FIG. 7C illustrates an exploded view of complete toroidal gearbox 20, comprising dual function gear 23, output gear 25, spiral face gear 22, an internal ring 26 upon which the other gears may be mounted, output gear bearings 27, spiral face gear bearings 28, shaft bearings 29, and a gear shaft 24.

Dual function gear 23 may be mounted on internal ring 26 using gear shaft 24 and associated shaft bearings 29. Spiral face gear 22 may be mounted on internal ring 26 using spiral face gear bearings 28 and may then be meshed with dual function gear 23. Output gear 25 may be mounted on internal ring 26 using output gear bearings 27, also known as slewing bearings, and may then be meshed with dual function gear 23. Toroidal gearbox 20 may be contained in a housing (not shown).

Bearings 27 and 28 may be rolling or sliding bearings and may be magnetic bearings or other known bearings capable of carrying axial, radial and moment loads. These may be made from steel, plastic, ceramic, bronze, or other known materials that provide a low frictional rotation. Bearings 29 may be rolling bearings made of steel, bronze, plastic, ceramic or combination of mentioned materials or alternative materials or other known materials which provide an ability to rotate with low friction. Alternatively, bronze bushings, plastic bushings, or other materials with friction reducing coatings, like DLC, dry lubricants, Teflon coatings, or other known solutions, may be used to keep friction low during rotation.

Figure 8:
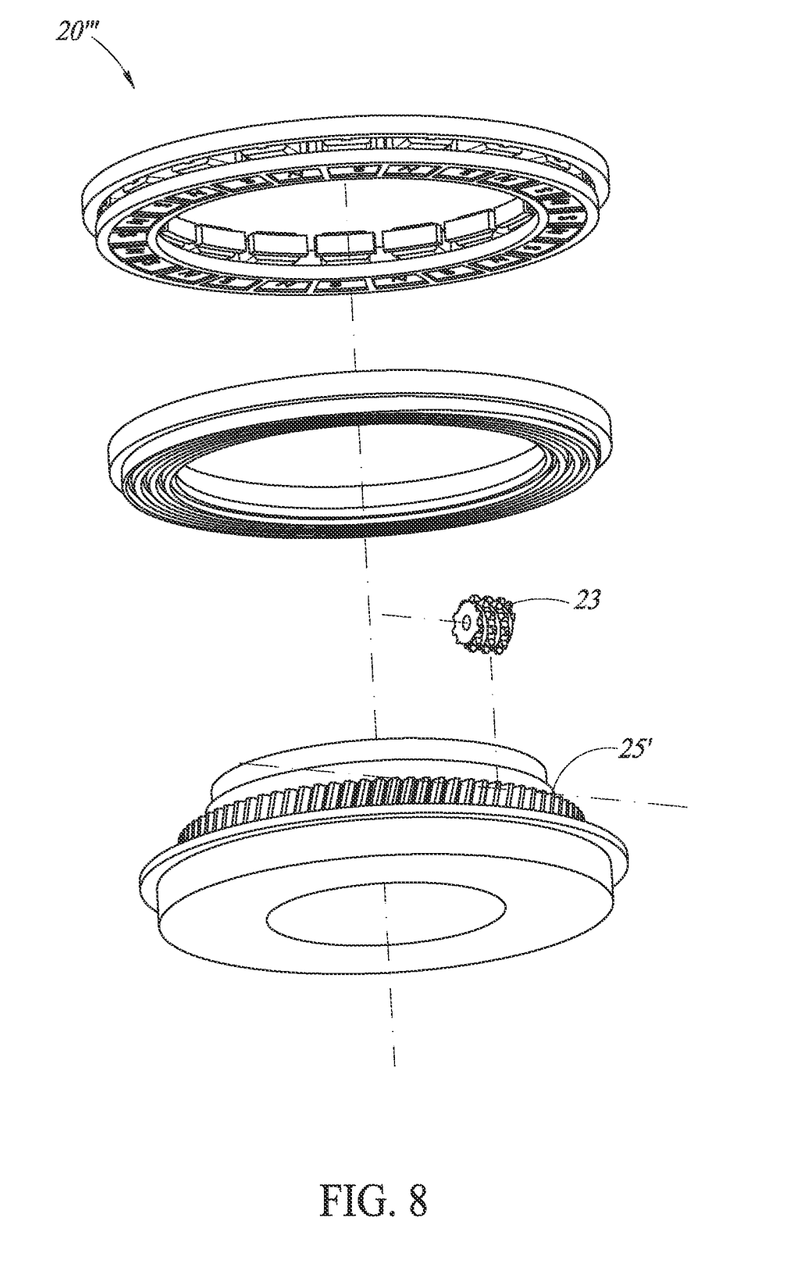
FIG. 8 is a schematic illustration of a toroidal gearbox with an externally geared output gear, constructed and operative in accordance with a fourth preferred embodiment of the present invention.

It will be appreciated that toroidal gearbox 20 may be operated in 3 modes: (1) spiral face gear 22 may be fixed to a housing such that rotation of the entire assembly results in rotation of output gear 25; (2) output gear 25 may be fixed to the housing such that rotation of spiral face gear 22 results in rotation of the entire assembly; and (3) spiral face gear 22 and output gear 25 may be free to rotate with respect to the housing. It will be appreciated that toroidal gearbox 20 may also comprise a plurality of dual function gears 23, as described herein above. In an alternative preferred embodiment of the present invention, shown in FIG. 8 to which reference is now briefly made, a toroidal gearbox 20''' may comprise an externally geared output gear 25'. Toroidal gearbox 20''' comprises an externally geared, output gear 25'. Toroidal gear box 20''' may also comprise a plurality of dual function gears 23 as described hereinabove.

It will also be appreciated that each of toroidal gearboxes 20, 20', 20'' and 20''' may be fitted with an anti-backlash mechanism.

It will be further appreciated that, for low transmission ratios, toroidal gearboxes 20, 20', 20'' and 20''' may be operated so as to transmit rotational reverse motion (i.e., from output gear 25 to spiral face drive 22).

It will be appreciated that the various toroidal gearboxes 20, 20', 20'' and 20''' may provide a high drive torque vs. mass and volume, through high ratio gearing and dual gearing techniques. Dual gearing ratios are higher than single gear solutions and are able to generate higher torques required for loads that develop high moments of inertia under high acceleration. The toroidal gearboxes may also increase effective load handling through use of multiple dual function gears 23 as described hereinabove.

It will be further appreciated that toroidal gearboxes 20, 20', 20'' and 20''', which comprises dual gearing and a toroidal motor, may provide an effective off-the-shelf, drop-in solution that may remove the need for expert design services and fabrication, lowering costs and design cycles. The design also incorporates opening 5 (FIG. 2A) through which to thread supply lines, waveguides and optical lines. Slip rings may easily be integrated into the design for device electrical supply. Toroidal gearboxes 20, 20', 20'' and 20''' may provide a high transmission ratio gearbox device of ring shape for easy integration inside mechanisms with limited space, such as robotic rotating joints for moving robotic arms.

It will be appreciated that the toroidal gearboxes of the present invention may be installed into the same housing as rolling bearings, for use in positioning mechanisms with rotary joints.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A toroidal gearbox comprising:
    at least one dual function gear;
    a toroidal spiral face drive to mesh with said at least one dual function gear;
    an output gear to mesh with said at least one dual function gear:
    an internal ring;
    a spiral face drive bearing mounted on said internal ring and supporting said toroidal spiral face drive;
    an output gear bearing mounted on said internal ring and supporting said output gear;
    a gear shaft mounted on said internal ring and supporting said at least one dual function gear; and
    shaft bearings mounted on said internal ring and supporting said gear shaft.

2. The gearbox of claim 1, wherein said at least one dual function gear has teeth which have a combined worm and cylindrical gear teeth shape.

3. The gearbox of claim 1, wherein said at least one dual function gear has an axis perpendicular to a central axis of said toroidal spiral face drive.

4. The gearbox of claim 1, wherein said at least one dual function gear has an axis perpendicular to a central axis of said cylindrical gear.

5. The gearbox of claim 1, wherein said toroidal spiral face drive has at least one spiral start.

6. The gearbox of claim 1, wherein said output gear is one of: a spur gear, and a helical gear.

7. The gearbox of claim 2, wherein said at least one dual function gear has one of: a barrel profile and an hourglass profile.

8. The gearbox of claim 2, wherein at least a portion of said teeth are cut with crowning.

9. The gearbox of claim 1, comprising a toroidal motor to drive said toroidal spiral face drive.

10. The gearbox of claim 1, wherein said toroidal spiral face drive and said output gear have a toroidal shape surrounding a circular opening centered around a gearbox axis.

11. The gearbox of claim 1, wherein said at least one dual function gear is a plurality of said dual function gears arranged in a planetary arrangement.

12. The gearbox of claim 1, wherein said shaft bearings are rolling bearings fabricated from at least one of: steel, plastic, ceramic, and bronze.

13. The gearbox of claim 1, wherein said shaft bearings are at least one of: rolling bearings, sliding bearings, and magnetic bearings.

14. The gearbox of claim 1, wherein said gearbox is configured to transmit rotational reverse motion from said cylindrical gear to said toroidal spiral face drive.

* * * * *